Patented Oct. 25, 1932

1,885,026

UNITED STATES PATENT OFFICE

GORDON D. PATTERSON, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITION

No Drawing.  Application filed February 24, 1930. Serial No. 431,044.

This invention relates to the art of coating compositions, and more particularly to coating compositions that are substantially free from cellulose derivatives and yet are resistant to outside atmospheric influences.

I have discovered that, by using polyhydric alcohol-polybasic acid resins of certain types indicated hereinafter, as the vehicle, it is possible to produce a wide range of pigmented coating compositions for outside use that possess many advantages which it has not been possible to obtain with paints using drying oil or varnish type vehicles.

I have also discovered that by the use of resins of this type it is possible to utilize, in coating compositions which are resistant to outside atmospheric influences, pigments and pigment combinations which are not satisfactory when used with drying oil or varnish type vehicles.

It is therefore an object of this invention to produce new and useful pigmented coating compositions.

It is another object of this invention to produce pigmented coating compositions which have better resistance to chalking, checking and cracking, as well as a more rapid drying rate.

It is a further object of this invention to produce durable coating compositions which may be made up with single pigments.

It is a still further object of this invention to produce durable coating compositions which will form films that have higher percentages of pigments than has heretofore been possible, in order to obtain high hiding power with fewer coats.

It is a special object of this invention to produce coating compositions that are especially resistant to outside atmospheric influences.

It is a further special object of this invention to produce durable coating compositions for outside use which contain a titanate as the principal pigment.

With the above and other objects in view, which will be apparent as the description proceeds, I have set forth my invention in the following specification and have included the following examples of paint and enamel compositions embodying my invention by way of illustration and not as a limitation:

*Example 1.—Single pigment white enamel*

| | Parts by weight |
|---|---|
| Barium titanate | 204.0 |
| Resin A (Acid No. 5.2) | 100.0 |
| Cobalt linoleate | 0.4 |
| Manganese linoleate | 0.4 |
| Mineral thinner | 117.0 |
| Total | 421.8 |

Resin A used in the above composition was formed from the following ingredients using the proportions indicated:

| | Parts by weight |
|---|---|
| Glycerol | 17.11 |
| Linseed oil acids | 55.80 |
| Phthalic anhydride | 27.09 |
| Total | 100.00 |

*Example 2.—Mixed pigment white paint*

| | Parts by weight |
|---|---|
| Barium titanate | 120.0 |
| Lithopone | 61.0 |
| Resin A (Acid No. 5.2) | 100.0 |
| Cobalt linoleate | 0.4 |
| Manganese linoleate | 0.4 |
| Mineral thinner | 75.0 |
| Total | 356.8 |

*Example 3.—Mixed pigment white paint*

| | Parts by weight |
|---|---|
| Barium titanate | 126.0 |
| Basic carbonate white lead | 68.0 |
| Resin B (Acid No. 2.5) | 100.0 |
| Cobalt linoleate | 0.4 |
| Manganese linoleate | 0.4 |
| Mineral thinner | 70.0 |
| Total | 364.8 |

Resin B used in the above composition was formed from the following ingredients using the proportions indicated:

| | Parts by weight |
|---|---|
| Glycerol | 13.43 |
| Linseed oil acids | 72.06 |
| Phthalic anhydride | 14.51 |
| Total | 100.00 |

Example 4.—Gray paint

| | Parts by weight |
|---|---|
| Barium titanate | 202.0 |
| Carbon black | 2.0 |
| Resin D (Acid No. 5.2) | 100.0 |
| Cobalt linoleate | 0.4 |
| Manganese linoleate | 0.4 |
| Mineral thinner | 95.0 |
| Total | 399.8 |

Resin D used in the above composition was formed from the following ingredients using the proportions indicated:

| | Parts by weight |
|---|---|
| Glycerol | 11.87 |
| Linseed oil | 60.10 |
| Phthalic anhydride | 28.03 |
| Total | 100.00 |

Example 5.—Mixed pigment white paint

| | Parts by weight |
|---|---|
| Barium titanate | 135.0 |
| Zinc oxide (5% leaded) | 70.0 |
| Resin F (Acid No. 2.7) | 100.0 |
| Cobalt linoleate | 0.4 |
| Manganese linoleate | 0.4 |
| Mineral thinner | 107.0 |
| Total | 412.8 |

Resin F used in the above composition was formed from the following ingredients using the proportions indicated:

| | Parts by weight |
|---|---|
| Glycerol | 16.30 |
| Phthalic anhydride | 27.24 |
| Linseed oil acids | 47.10 |
| China wood oil | 9.36 |
| Total | 100.00 |

Example 6.—Mixed pigment white paint

| | Parts by weight |
|---|---|
| Barium titanate | 62.0 |
| Barium base titanium pigment | 111.0 |
| Resin J (Acid No. 30) | 100.0 |
| Cobalt linoleate | 0.4 |
| Manganese linoleate | 0.4 |
| Mineral thinner | 95.0 |
| Total | 368.8 |

Resin J used in the above composition was formed from the following ingredients using the proportions indicated:

| | Parts by weight |
|---|---|
| Glycerol | 21.71 |
| Phthalic anhydride | 42.83 |
| Linseed oil acids | 35.46 |
| Total | 100.00 |

The coating compositions set forth above, as well as other coating compositions falling within the scope of the present invention, are prepared by grinding or dispersing the pigment or pigment combination with the resin in the presence of sufficient solvent and diluent to provide a consistency suited to the dispersing device used. After dispersion the paint is reduced to application consistency with additional solvent or diluent. The drier may be added at any desired point in the preparation of the coating composition.

Where desired, extenders or fillers, such as blanc fixe, barytes, silica, asbestine, whiting, talc and china clay, may be incorporated in the coating compositions falling within the scope of the present invention.

The polyhydric alcohol-polybasic acid resins referred to above may be made in any well known manner as, for example, by heating the ingredients at any suitable temperature above the melting point of the materials until resinificaton is complete. In the preparation of resins of unusually light color, it has been found preferable to carry out the reaction in the presence of an inert gas. If desired, refluxing or partial refluxing may be resorted or the operation may be carried out at elevated or reduced pressures. Where oil is used in place of oil acids, it is desirable, in order to obtain a homogeneous product, to heat the oil and glycerol together before adding the phthalic anhydride. Other modifying ingredients, if used, may be added in either stage.

In general it is advisable to maintain the acid number of the resin at the lowest possible value, and this is usually accomplished by increasing the temperature or the period of heating, but stopping before the gel point is reached. In certain cases in which an extremely low acid number is unnecessary, the heating is stopped when a low enough acid number is obtained, in order to avoid unduly increasing the viscosity of the resin. The allowable range of acid numbers will vary with the type of polyhydric alcohol-polybasic acid resin used and also with the type and quantity of pigment. With chemically active pigments, like zinc oxide or basic carbonate white lead, the acid number should preferably be below 20. With chemically inert pigments, like barium base titanium pigments, the question of acid number is not as important as in the case of chemically active pigments. In general, I prefer to maintain the acid number below 30 for resins having a combined oil acids content of 35% or more. Below this oil acids content the acid number should preferably be at the lowest value at which it is possible to prepare the resin. In any case the acid number must be low enough to avoid instability of the liquid composition as evidenced by livering or gelling induced by chemically reactive pigments.

By the term "modified polyhydric alcohol-polybasic acid resin," as used herein, I mean the resinous condensation product resulting from the reaction of one or more polyhydric alcohols and one or more polybasic acids with one or more of the following modifying ingredients; drying oils, semi-drying oils, synthetic drying oils, and monobasic acids, especially those derived from drying oils and semi-drying oils, synthetic drying oil acids, and mixtures of one or more of these modifying ingredients with natural resins, as well as equivalent resinous condensation products, such as those resulting from the reaction of polybasic acids and partially acylated polyhydric alcohols where the acylating material is one or more of the acidic modifying ingredients referred to above.

By the term "modifying agent," as used herein, I mean an ingredient of the type mentioned in the definition of "modified polyhydric alcohol-polybasic acid resin" in the preceding paragraph, other than a polyhydric alcohol or a polybasic acid.

By the term "oil modified," as used herein, I mean that the product referred to is chemically modified by one or more drying oils, semi-drying oils, synthetic drying oils, drying oil acids, semi-drying oil acids, and/or synthetic drying oil acids.

As indicated by the above examples it will be apparent that my invention is applicable in connection with a wide range of oil modified polyhydric alcohol-polybasic acid resins, and my work has indicated that the modifying ingredients may vary over a wide range, although I prefer that they be used in amounts equal to from approximately 22 to 82% of the total composition where the modifying agent is linseed oil acids, and over slightly narrower ranges where the linseed oil acids are replaced, in whole or in part, by other drying oil acids or by drying oils, or by mixtures of drying oil acids and either semi-drying oils or natural resins. Where linseed oil acids are replaced by other modifying agents, as indicated above, I have found it desirable to make these replacements on a molecular weight basis in order to obtain substantially equivalent results, although substitutions which are not made strictly on a molecular weight basis may be resorted to without sacrificing many of the desirable advantages of my invention.

Since straight polyhydric alcohol-polybasic acid resins contain no glycerides of oil acids, and oil type vehicles are largely glycerides of oil acids, it will be apparent that the major improvements which it is the purpose of this invention to accomplish are attained where a substantial amount of oil acids, or their equivalent, is introduced into the resins used. However, where the amount of oil acids is very high, so that only a small amount of phthalic anhydride is included, the improvement in durability over oil type compositions is slight, but the improvement becomes more noticeable as the quantity of phthalic anhydride is increased, provided a substantial amount of oil acids or their equivalent is present.

Resins high in combined oil acids content can be used successfully over any type of surface to which oil or varnish paints can be applied. However, resins of lower combined oil-acids content are less well adapted than those of higher combined oil acids content for use on surfaces which are subjected to severe expansion or contraction, such as occurs in soft woods like white pine under the influence of moisture. The lower oil length resins, however, are admirably suited for use over surfaces such as metal and have been successfully applied directly to steel without a preliminary system of undercoat films such as are ordinarily required. Resins low in combined oil acids content, which produce pigmented films having the same drying time as short oil varnishes, develop markedly superior durability in comparison with the latter type products.

For use over wood I prefer, but do not restrict myself to, the range of 35% to 72% combined oil acids, expressed as linseed oil acids. Where the combined oil acids content of the resin is as low as from 22% to 35%, expressed as linseed oil acids, the pigment combination should not contain more than 5% of chemically active pigments, such as zinc oxide or basic carbonate white lead. Furthermore, even in the range of from 35% to 45% combined oil acids, expressed as linseed oil acids, I find it is desirable to use a preponderance of chemically inert pigments as the film is sufficiently hard, and excessive hardness developed by chemically active pigments may cause too high a degree of brittleness.

In selecting resins for specific purpose paints, the principles pointed out above should be kept in mind.

Although the above examples have been limited to modified glyceryl phthalate resins I desire to have it understood that other polyhydric alcohol-polybasic acid resins having the general properties of those indicated may be substituted therefor.

The barium titanate pigment used in the above examples consisted mainly of a compound having the approximate composition $BaTiO_3$. It contained 53.3% of barium and 21.5% of titanium, calculated as the element. It had a relative oil absorption of 124 in comparison with ordinary lithopone as 100, and a hiding power in the same range as commercial barium base titanium pigment.

While the above examples are limited to the use of barium titanate, because this is the only titanate which is at present commercially available, it will be obvious that other titanates, such as zinc titanate, lead titanate, and calcium titanate, would be the equivalent of barium titanate for the purpose of the present invention.

Similarly, although the above examples are limited to the use of white and black pigments, it will be obvious that any other desired colors, as well as various combinations of white pigments, may be used with advantageous results. It is an important advantage of compositions of the type set forth herein that when they include colored pigments but do not include any titanium oxide pigment the resulting films are unusually resistant to the fading which is characteristic of paints and enamels using drying oil or varnish type vehicles. Where titanium oxide pigments are used, however, it is preferable not to include colored pigments inasmuch as the more rapid chalking of titanium oxide pigments tends to cause fading and spoil the general appearance when this pigment is combined with colored pigments.

Although the driers used in the above examples have been calculated on the basis of .05% of the particular metal based on the drying oil content of the resin, it will be obvious that other percentages may be used and that other driers may be substituted for those indicated.

I have found it desirable, in order to improve the brushing viscosity, to utilize solvents having relatively high boiling points, preferably above 140° C. Although mineral thinner is stressed as the solvent in the above examples, other solvents, such as petroleum distillates of high boiling point, especially with the addition of high boiling point organic solvents, may be used.

For resins as high in combined oil acids content as 56%, aliphatic solvents, such as mineral thinner, may ordinarily be used. However, as this value is reduced, the partial substitution of aromatic solvents, such as xylol or solvent naphtha, is usualy desirable in order to maintain the resins in solution and at low viscosity. In cases where brushing and flowing properties are important, the ease and time of brushing can be increased by incorporating high boiling solvents which prevent the early development of high viscosity in the film.

Inasmuch as polyhydric alcohol-polybasic acid resins prepared by different methods have different viscosities, I desire to have it understood that the proportion of solvent indicated in the above examples may be varied over relatively wide limits, depending on the particular resin used, its method of preparation, the pigment characteristics, and the method of applying the coating composition.

Heretofore the use of titanium oxide pigments in coating compositions for exposure to the weather has been limited because of the abnormal tendency of such pigments to chalk. This is so severe that oil films containing substantial amounts of titanium oxide pigments become thin and cease to hide or protect the under surface long before the average oil paint loses its protecting value. If a titanium oxide pigment is used alone in the usual linseed oil vehicle, such as is commonly used in high grade outside paints, the film is almost completely chalked away after three to six months' exposure, depending upon the severity of weathering and the thickness of the film. Thus, while basic carbonate white lead has been used for many years as a single pigment in oil paints, it was soon recognized that titanium oxide pigments could not be used in this way. Incorporation of zinc oxide with the titanium oxide pigment in linseed oil paints reduces the tendency of the film to chalk, but even the optimum proportions of these pigments are less durable in oil paint vehicles than the average outside paint, due to chalking of the film. The balancing of a formula containing zinc oxide and titanium oxide pigments is difficult, for insufficient zinc oxide leads to early chalking failure and an excess of this pigment causes the film to fail by cracking. Even at the optimum balance between severe chalking and the tendency to crack, an oil paint will ordinarily fail within one to one and one-half years on severely exposed surfaces, such as porch railings or window sills. Similarly pigmented coating compositions containing resin A do not fail in three years' exposure under the same conditions.

The failure of coating compositions containing oil type vehicles pigmented with titanium pigment and zinc oxide combinations is particularly noticeable when the zinc oxide content of the pigment combination is less than 20% or greater than 50%, whereas such pigment combinations are very durable when used with resin vehicles of the type disclosed herein. It is therefore evident that titanium oxide pigments are subject to severe limitations when considered for exterior use in ordinary oil vehicles.

The excessive chalking characteristic of titanium oxide pigments with outside paint vehicles is reduced markedly when certain polyhydric alcohol-polybasic acid type resins are used as the binding vehicle. In this way extremely durable coating compositions having unusually desirable properties can be prepared from titanium oxide pigments either alone or in combination with other pigments.

Moreover, polyhydric alcohol-polybasic acid resin films containing major quantities of titanium oxide pigments are not subject to the checking and cracking failure characteristic of ordinary paint films. This is a remarkable property of the resin paints which I have developed for it insures a satisfactory surface for repainting. Ultimately chalking develops in polyhydric alcohol-polybasic acid resin films containing substantial amounts of titanates, but the rate and degree of chalking is much less than for compositions containing equivalent quantities of titanium oxide pigments. For example, the coating composition of Example 1, given above, has been found to be substantially resistant to chalking during the first seven months exposure and then begin to chalk at a relatively slow rate. If barium base titanium pigment is substituted for barium titanate in the composition of Example 1 the film develops initial chalking within three months.

It is another important advantage of compositions of the type set forth herein that they are markedly resistant to checking and cracking failures.

Coating compositions for exterior use, particularly whites, are frequently lacking in the power to hide the under lying surface when only one or possibly two coats are applied. An obvious means for improving hiding power lies in increasing the pigment content of the film but this has not been possible in oil type compositions because of the harmful effect upon durability (increased chalking or checking and cracking). By the use of resins of the type disclosed herein, however, I have found that it is possible to bind larger quantities of pigments than normally can be used in paints, thus permitting the development of films having unusually high hiding power, and the use of a lesser number of coats, or coats having a lesser thickness, to secure satisfactory hiding without sacrifice in the ultimate durability of the films.

My improved compositions also form films which are more stable to sunlight and atmospheric influences and have better gloss retention than previous coating compositions.

I have also found that with coating compositions of the type set forth herein the surface drying takes place at a sufficiently rapid rate to keep the paint clean during the early stages of drying, thus avoiding the collection of dirt and flies, which is especially desirable under certain conditions of application and at certain seasons of the year. Moreover, films of these paints are not injured by exposure to rain shortly after application, whereas ordinarily oil paint films of the same age are spotted or washed away under the same circumstances. This is frequently an important factor in successful exterior painting.

It will therefore be apparent that I have developed a new and useful group of coating compositions that are substantially free from cellulose derivatives which have more rapid drying rates, better resistance to chalking, checking, and cracking, better gloss retention, and greater hiding power with fewer coats than compositions heretofore obtainable, and that the colors of the resulting films are more stable.

These coating compositions are valuable in a wide range of commercial applications, such as house paints, freight car paints and paints for general railway use, sign enamels and paints, and metal protective and decorative paints in general.

By the term "titanate", as used herein, I mean a pigment containing a non-alkali-metal salt of one or more oxygen acids of the element titanium (for example, barium titanate, zinc titanate, lead titanate, and calcium titanate), either alone or in conjunction with other modifying or extending ingredients.

By the terms "titanium" or "titanium pigment", as used herein, I mean a pigment containing chemical compounds of titanium (for example, titanium oxide), either alone or in conjunction with other modifying or extending ingredients.

By the term "barium base titanium pigment", as used herein, I mean a pigment containing barium sulfate and titanium oxide intimately blended or associated in the process of pigment manufacture, the particular composition referred to herein containing 75% of barium sulfate and 25% of titanium oxide.

By the term "zinc oxide pigment", as used herein, I mean a pigment containing zinc oxide which pigment does not contain, as an impurity, more than 8% by weight of lead compounds, calculated as lead sulfate.

By the term "lead pigment", as used herein, I mean a pigment of the type represented by basic carbonate white lead and basic sulfate white lead, or mixtures of these, excluding cases in which the lead is present as an impurity in zinc oxide pigments in an amount greater than 8%, calculated as lead sulfate.

By the terms "extenders" or "fillers", as used herein, I mean materials which, if incorporated with a modified polyhydric alcohol-polybasic acid resin vehicle, in the amounts in which pigments are ordinarily incorporated to produce enamels or paints, without the addition of a pigment thereto, yield transparent or semi-transparent films.

By the term "substantially free from cellulose derivatives", as used herein, I mean that the material referred to does not contain substantial quantities of cellulose derivatives.

Coating compositions falling within the scope of the present invention may also include minor proportions of additional ingredients, other than cellulose derivatives, commonly used as film forming materials, including drying oils, natural resins, synthetic resins, and materials exerting a water repellant or waterproofing action, such as paraffin greases. Where the pigment combination contains a substantial quantity of a reactive pigment, however, it is necessary either to avoid the use of additional acidic ingredients or to restrict the quantity added so that the resulting acidity of the coating composition does not exceed that indicated above as the maximum acid number for the particular oil acids content polyhydric alcohol-polybasic acid resin used.

As many apparently widely different embodiments of this invention may be made without departing from the spirit and scope thereof, it is to be understood that I do not limit myself to the specific embodiments thereof except as defined in the appended patent claims.

I claim:

1. A coating composition substantially free from cellulose derivatives which comprises a pigment containing a titanate of the group which consists of barium titanate, calcium titanate, zinc titanate and lead titanate and a vehicle comprising a resin which has, in combined form, the radicals of a polyhydric alcohol, a polybasic acid, and an oil having drying properties.

2. The coating composition of claim 1, in which the pigment consists of a titanate pigment.

3. The coating composition of claim 1, in which the pigment also contains a colored pigment.

In testimony whereof, I affix my signature.

GORDON D. PATTERSON.